United States Patent
Papasakellariou

(10) Patent No.: US 7,103,095 B2
(45) Date of Patent: Sep. 5, 2006

(54) SPREAD SPECTRUM CODE CORRELATOR

(75) Inventor: Aris Papasakellariou, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 874 days.

(21) Appl. No.: 09/796,127

(22) Filed: Feb. 28, 2001

(65) Prior Publication Data

US 2001/0053177 A1 Dec. 20, 2001

Related U.S. Application Data

(60) Provisional application No. 60/186,988, filed on Mar. 6, 2000.

(51) Int. Cl.
*H04B 1/707* (2006.01)

(52) U.S. Cl. .................................. 375/150; 375/343
(58) Field of Classification Search ............... 375/142, 375/143, 150, 342, 343, 316, 141, 145, 147, 375/149, 354, 362, 367; 370/209, 350
See application file for complete search history.

(56) References Cited

U.S. PATENT DOCUMENTS

| | | | |
|---|---|---|---|
| 4,507,746 A | | 3/1985 | Fletcher, Jr. |
| 5,144,640 A | * | 9/1992 | Yamamoto ................... 375/150 |
| 5,710,768 A | * | 1/1998 | Ziv et al. ..................... 370/342 |
| 5,872,808 A | | 2/1999 | Davidovici et al. |
| 5,933,447 A | * | 8/1999 | Tran et al. ................... 375/152 |
| 6,014,405 A | | 1/2000 | Garodnick et al. |
| 6,163,567 A | * | 12/2000 | Hatch ......................... 375/149 |
| 6,208,477 B1 | * | 3/2001 | Cloke et al. ................... 360/31 |
| 6,263,011 B1 | * | 7/2001 | Paik et al. ................... 375/149 |
| 6,363,108 B1 | * | 3/2002 | Agrawal et al. ............. 375/152 |
| 6,366,606 B1 | * | 4/2002 | Sriram ........................ 375/150 |
| 6,567,483 B1 | * | 5/2003 | Dent et al. ................... 375/343 |

FOREIGN PATENT DOCUMENTS

EP 0945992 A1 9/1999

* cited by examiner

*Primary Examiner*—Khanh Tran
(74) *Attorney, Agent, or Firm*—Carlton H. Hoel; W. James Brady, III; Frederick J. Telecky, Jr.

(57) ABSTRACT

Spread spectrum receiver with correlating coprocessor having common datapath for received signal correlations and code cross-correlations for efficient interference cancellation methods.

4 Claims, 2 Drawing Sheets

SPREAD SPECTRUM CODE CORRELATOR

CROSS-REFERENCE TO RELATED APPLICATIONS

This application claims priority from provisional application Ser. No. 60/186,988, filed Mar. 6, 2000.

BACKGROUND OF THE INVENTION

The invention relates to electronic devices, and, more particularly, to detection in spread spectrum communications and related circuitry and methods.

Spread spectrum wireless communications utilize a radio frequency bandwidth greater than the minimum bandwidth required for the transmitted data rate, but many users may simultaneously occupy that bandwidth. For code division multiple access (CDMA) each of the many simultaneous users has one or more pseudo-random CDMA codes to "despread" by correlating the spread spectrum signals sent to that user and thereby recover the corresponding information data. Each pseudo-random CDMA code may be an orthogonal (Walsh) code, a pseudo-noise (PN) code, a Gold code, or combinations (modulo-2 additions) of such codes. After despreading the received signal at the correct time instant, the user recovers the corresponding information while the remaining interfering signals and noise appear noise-like. For example, the interim standard IS-95 for such CDMA communications employs channels of 1.25 MHz bandwidth and a code pulse (chip) interval $T_C$ of 0.8136 microsecond with 64 chips per transmitted bit. The wideband CDMA (WCDMA) proposal employs 3.84 MHz bandwidth and the CDMA code length applied to each information symbol may vary from 4 chips to 256 chips. The CDMA codes for each user are typically produced as the modulo-2 addition of Walsh codes with a pseudo-random code (two pseudo-random codes for QPSK modulation) to improve the noise-like nature of the resulting signal. A cellular system could employ IS-95 or WCDMA for the air interface between a base station and a mobile station.

Signals transmitted by multiple users simultaneously occupy the same frequency band in CDMA. A receiver discriminates among the multiple signals by exploiting the properties of the spreading and scrambling codes that are applied to the signal of each user. The receiver attempts to match in time with the codes of the desired signal a replica of those spreading and scrambling codes. Only then the demodulation result is meaningful; otherwise it appears noise-like. Thus, if the arriving signals have different codes or different code offsets, they can be discriminated at the receiver.

In the downlink of a cellular communication system (the communication from a base station to mobile terminals) the wireless channel may introduce multipath propagation. Even if the signals transmitted by the base station are spread using orthogonal codes (Walsh codes), the multipath propagation will destroy the orthogonality and produce multiple-access interference (MAI). In the uplink (the communication from a mobile terminal to a base station) the signals are asynchronously transmitted. Orthogonality in this case cannot be achieved and each signal will experience MAI.

Interference cancellation attempts to suppress the MAI by estimating and subtracting the contribution from each interfering user of interest from the received signal. This can be accomplished both before and after despreading. The challenge in the implementation of an interference cancellation method comes from the fact that it may have to be performed for many signals (and their multipath components). If the necessary parameters to implement interference cancellation have to be evaluated for every data symbol, the computation and storage requirements can place a significant burden on the overall receiver design. If instead, the previous parameters need to be updated at a slower rate than the symbol rate, the implementation is considerably simplified.

The prevailing considerations governing the implementation of interference cancellation are complexity and performance with the former being the dominant one. One implementation approach is to perform interference cancellation before despreading. Then, interference cancellation methods need to regenerate the signal of each interferer, based on a decision for each interfering signal's information symbol, phase, and received power, and subtract it from the received signal. Another implementation approach that avoids signal regeneration is to compute the code cross-correlations and perform interference cancellation on the decision statistic of the desired signal after despreading.

To cancel interference before despreading, the interfering signals of interest need to be regenerated at the receiver and then subtracted, according to some of a variety of possible interference cancellation approaches, from the received signal. The information needed to accurately describe and hence regenerate the interfering signals consists, for each such signal, of the signal power, the signal phase, the information data symbol, the beginning of the symbol period relative to the beginning of the symbol period of the desired signal at the receiver, and the spreading and scrambling codes.

Alternatively, the interference can be cancelled after despreading without having to re-spread and regenerate the signals. The interference effect after despreading is proportional to the code cross-correlations of the interfering and desired signals. If the codes were orthogonal, the effect of the interfering signals would be zero. For non-zero cross-correlations, the interfering signals have a non-zero effect on the decision statistics of the desired signal. The contribution of each interferer on the decision statistic of the desired signal can be removed if in addition to the previous information, the code cross-correlations are computed. Then, instead of regenerating each interfering signal and subtracting it from the received signal before despreading, the code cross-correlations are simply multiplied by each interfering signal's complex amplitude (power and phase) and information symbol. The result is subsequently subtracted from the output of the despreader for the desired for the desired signal.

For signals having the same data rate, the desired signal is affected by two consecutive symbols from each interferer. If the interfering signal is re-spread and subtracted from the received signal prior to despreading, the regenerated signal needs to be buffered and subtracted at the correct time instant. If the code cross-correlations are computed instead and interference cancellation is applied after despreading, two different cross-correlation values need to be computed for each of the two interfering symbols.

For signals having different data rates, the buffering requirements are determined by the lowest rate signal(s). The lowest rate signal is assigned a spreading code with the largest number of chips per symbol period. To perform interference cancellation by re-spreading, the number of chip samples required for buffering equals to the number of chips of the largest length spreading code. This also applies to higher data rate signals having a smaller number of chips per information symbol. The above statement assumes that the number of chips per symbol for any lower data rate signals(s) is an integer multiple of the number of chips per symbol for any of the higher data rate signal(s). Otherwise, the number of chip samples need to be buffered is equal to the least common multiple of all data rates.

If interference cancellation is performed after despreading, the number of code cross-correlations that has to be computed should also reflect the existence, if any, of different data rates. If N is the integer ceiling of the ratio between the lengths of the spreading codes assigned to a lower and a higher rate signal, the number of code cross-correlations that need to be evaluated to perform interference cancellation is equal to N for synchronous signal reception without orthogonal codes and equal to N+1 for asynchronous signal reception.

Hence the problem of cross-correlation computations for codes and correlations with received signals arises for interference cancellation methods and efficient plus flexible implementations are lacking.

SUMMARY OF THE INVENTION

The present invention provides spread spectrum code cross-correlation processor with a common datapath for both received signal correlations and code cross correlations.

This has advantages including providing flexible (i.e., programmable) and efficient interference cancellation.

BRIEF DESCRIPTION OF THE DRAWINGS

The drawings are heuristic for clarity.

DESCRIPTION OF THE PREFERRED EMBODIMENTS

1. Code Correlating Processor Preferred Embodiments

Figure 1:
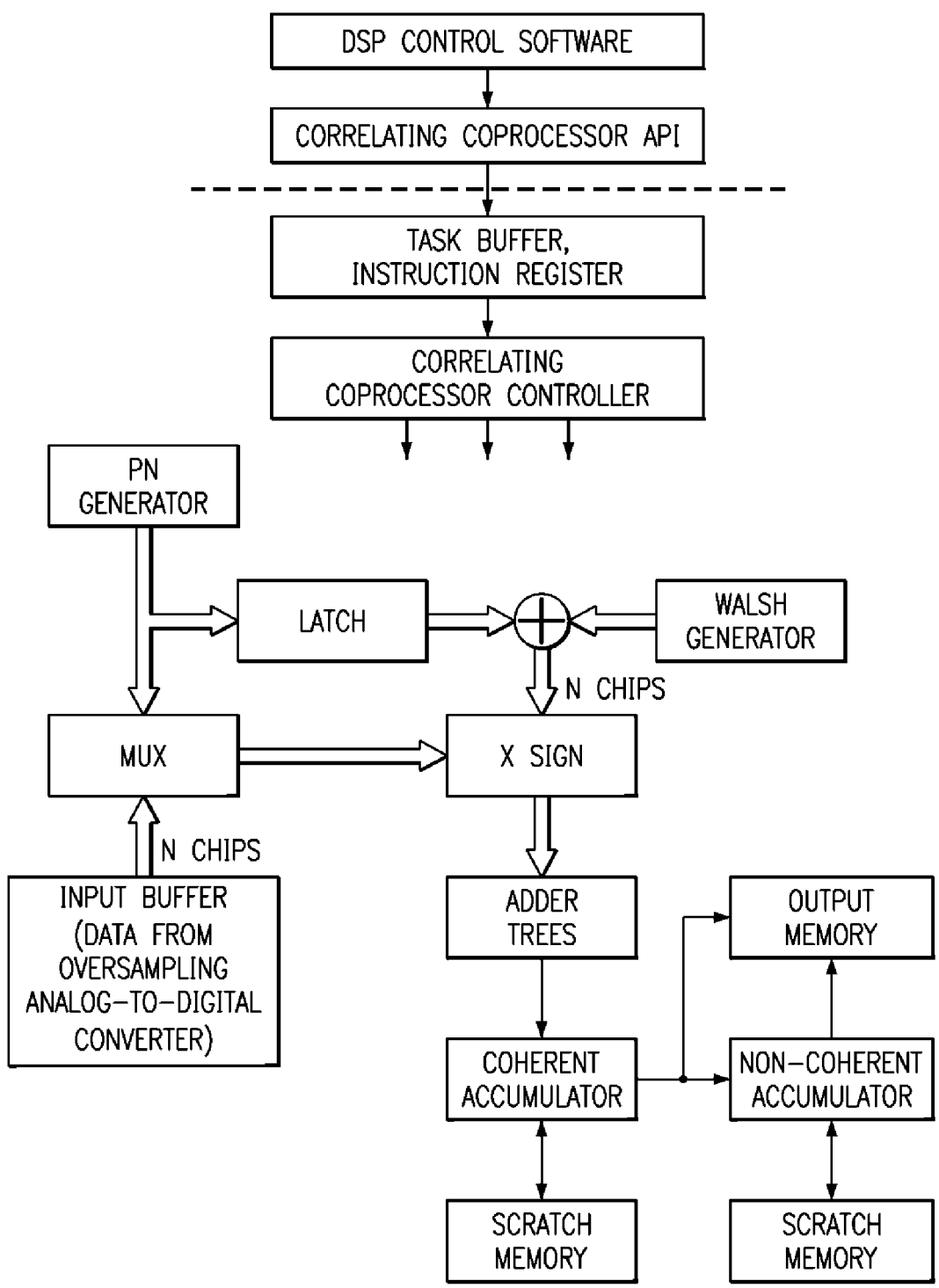
FIGS. 1–2 illustrate code correlating processors.
Figure 2:
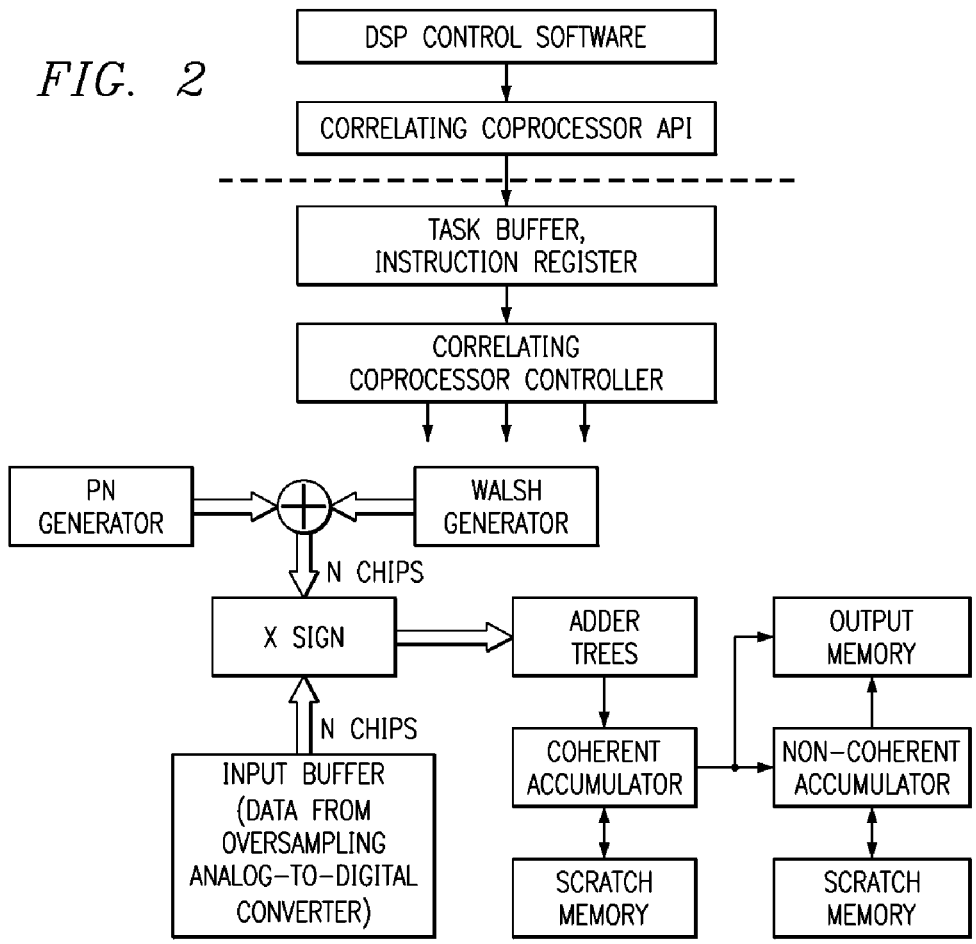

The preferred embodiment spread spectrum code correlating processors (CCPs) have capability to cross correlate codes and correlate received signals with codes using the same datapath by multiplexing. FIGS. 1–2 illustrate preferred embodiment processor datapaths configured as a coprocessor for a digital signal processor (DSP). The CCP is a flexible vector-based correlation engine that typically is used for CDMA chip rate processing. The CCP may be used for code search and despreading in rake reception. The vector datapath operates on a set of N chips in parallel. The stored vector of N chips are multiplied by N chips of the PN code, and the partial correlation results are stored in scratch memory, to be accumulated with subsequent partial results. A new set of N PN chips are generated for each finger to be run on the CCP. However, the PN chips are "frozen" until all the active channels are processed; channels are distinguished by their orthogonal Walsh codes.

To support a rake receiver the CCP controller performs (pseudocode) the following for a CCP as in FIG. 2:
for each N chips in the input buffer
{
  for each active finger of the rake
  {
    generate N PN chips at finger-specific offset and store in latch;
    for each active channel (multicode)
    {
      multiply (PN xor Walsh) chips with the chips from the input buffer;
      add resulting N complex numbers;
      accumulate with previous partial result if needed;
      store in coherent accumulator for subsequent accumulation;
    }
  }
}

FIG. 1 shows a preferred embodiment CCP which extends the FIG. 2 CCP with a multiplexer so that input buffer data can be replaced with PN generator data; this provides for efficient cross-correlation computations of two N-chip PN sequence segments that are generated at distinct cycles of the CCP. Thus the controller can now do the following in the CCP of FIG. 1:
for each N chips in input buffer
{
  for each active finger of the rake
  {
    generate N PN chips at finger-specific offset and store in latch;
    for each active channel (multicode)
    {
      multiply (PN xor Walsh) with the chips from the input buffer;
      add resulting N complex numbers;
      accumulate with previous partial result if needed;
      store in coherent accumulator for subsequent accumulation;
      if symbol despreading is complete, then store symbol in output memory;
    }
    for every PN code/offset with which cross-correlations are needed
    {
      select N PN chips instead of the input samples from input buffer;
      generate PN with which cross-correlation is desired;
      multiply generated PN with PN segment stored in latch;
      add resulting N numbers;
      accumulate with previous partial result if needed;
      store in coherent accumulator for subsequent accumulation;
      store completed partial correlations in output memory;
    }
  }
}

Thus each cross correlation value desired requires only one CCP cycle. The cross correlation outputs may be stored in an output memory, similar to how despread symbols are stored in the finger symbol buffer. The cross correlation values are then used in the interference cancellation methods described in the next section. The foregoing method of computing cross correlations to perform interference cancellation has the following advantages over a method that relies on respreading and subsequent despreading: (1) lesser memory required because the preferred embodiment method stores despread symbols, as opposed to raw chips that would have to be stored for a respread/despread method; (2) the computation rate is much lower because processing is done on despread symbols; this allows the interference cancellation method to run in software on a DSP, rather than in a hardwired ASIC and thereby provide flexibility; and (3) simpler hardware because processing is completely feed-forward, as far as the chip-rate processing is concerned.

Figure 3:
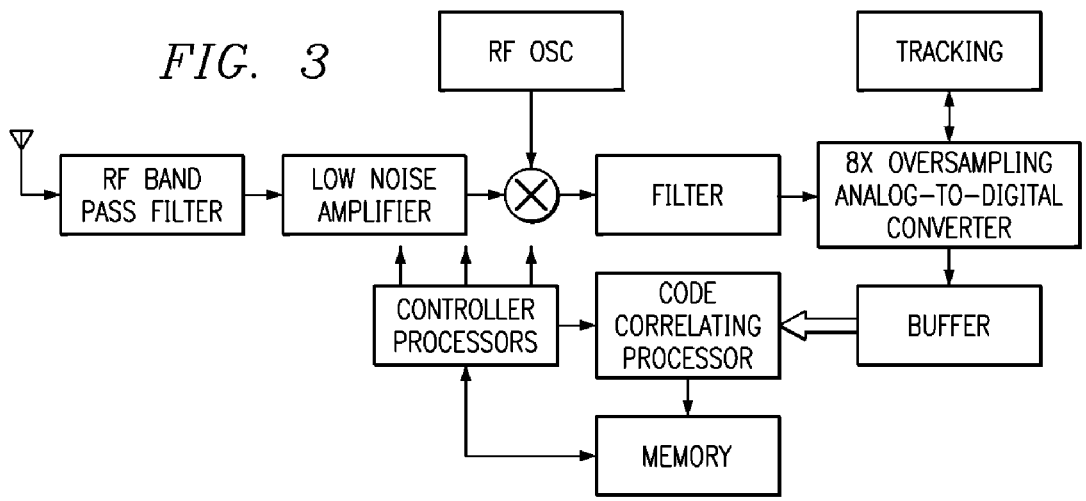
FIG. 3 shows a receiver with a code correlating processor

FIG. 3 illustrates a preferred embodiment receiver which includes a preferred embodiment code correlating coprocessor.

2. Multiple Access Interference Cancellation Preferred Embodiments

The preferred embodiment code correlating coprocessor illustrated in FIG. 1 and described in the previous section applies to interference cancellation at the cross-correlation computation as noted in the following preferred embodiment interference cancellation.

First, consider the simplest case of a CDMA system with mobile users' signals as binary phase-shift keyed and synchronously received at a base station which employs iterative parallel interference cancellation. Initially, let $C_m(t)$ be the code (chip sequence) for the $m^{th}$ mobile and $u_m$ the corresponding bit. The received (complex) signal in baseband at the base station is $$r(t) = \sigma_{\sqrt{}} S_m u_m C_m(t) \exp(l\phi_m) + n(t)$$

with the sum over the mobile users, $S_m$ is the received power of the $m^{th}$ user's signal, $\Phi_m$ is its carrier phase, and n(t) is a noise term. The base station has a detector tracking each user's signal, and for correlations over the bit (symbol) interval $0 \leq t \leq T_b$ this yields for the $m^{th}$ user detector:

$$r_m = 1/T_b \int r(t) C_m(t) dt = \sqrt{S_m} u_m \exp(l\Phi_m) + \Sigma \sqrt{S_n} U_n R_{m,n} \exp(l\phi_n) + n_m$$

where the integration range is over the symbol interval; the sum is over n; $R_{m,n}$ is the cross-correlation of the codes for the $m^{th}$ and $n^{th}$ users over the bit interval ($R_{m,n} = 1/T_b \int C_m(t) C_n(t) dt$ but with $R_{m,m} = 0$), and $n_m = 1/T_b \int n(t) C_m(t) dt$. The received signal r(t) is sampled at a rate typically 4–8 times the chip rate, and the integrations are sums.

The preferred embodiment CCP of FIG. 1 applies to compute sequentially (1) the desired signal by correlation (chipwise multiplies and product additions) of the N chip input buffer samples with the $m^{th}$ code in the latch XORed with the Walsh code for the finger and then (2) the code cross-correlations $R_{m,n}$ using the $m^{th}$ code in the latch and the PN generator sequentially producing the $n^{th}$ codes needed for in the interference sum. The multiplexer permits the switch from (1) input buffer samples to (2) PN code generator output.

Then set $y_m = r_m \sqrt{2T_b/N_o}$ to normalize the projection of the received signal on the $m^{th}$ code where $N_o$ is the noise power density and set $E_n = S_n T_b$ which is the bit energy in the $n^{th}$ user's signal. This gives:

$$y_m \exp(-l\Phi_m) = \sqrt{2E_m/N_o} u_m + \Sigma \sqrt{2E_n/N_o} u_n R_{m,n} \exp(l(\phi_n - \phi_m)) + Z_m \exp(-l\phi_m)$$

where $z_m \exp(-l \Phi_m)$ is a normal random variable with zero mean and variance 2 (variance 1 in each real dimension). Then taking the real parts of these equations gives:

$$Y_m = \sqrt{2E_m/N_o} u_m + I_m + N_m$$

where $Y_m = \text{Re}\{y_m \exp(-l \Phi_m)\}$, $I_m$ is the real part of the multi-user interference experienced by user m due to the other users, and $N_m$ is a normal random variable with zero mean and variance 1. Then let $\hat{I}_m$ be an estimate for $I_m$ based on estimates of the other users' data bits, so $I_m - \hat{I}_m$ represents the residual (uncancelled) real multiuser interference. Hence, $$Y_m = \sqrt{2E_m/N_o} u_m + \hat{I}_m + W_m$$

where $W_m = I_m - \hat{I}_m + N_m$ will be modeled as a normal random variable. Because estimates of the other users' data bits are not available at the time that user m's data bit is being estimated, invoke a multistage iterative process in which estimates for the other users' data bits are obtained from the previous stage. Partial cancellation in each stage with linear or non-linear maximum likelihood decision statistics can be used, but consider total cancellation in each stage.

Let $\hat{u}_n(k)$ be the $k^{th}$ stage estimate for $u_n$. There is no information beyond the received signals to start with, so take the initial stage (k=0) estimates for the data bits as $\hat{u}_n(0) = \text{sgn}\{Y_n\}$. Similarly, let the k stage estimate for the interference be $\hat{I}_m(k) = \text{Re}\{\Sigma \sqrt{2E_n/N_o} \hat{u}_n(k-1) R_{m,n} \exp(l(\phi_n - \phi_m))\}$. Then with $W_m(k) = I_m - \hat{I}_m(k) + N_m$, the $k^{th}$ stage data bit equations become for $1 \leq m \leq \text{number\_of\_users}$:

$$Y_m = \sqrt{2E_m/N_o} u_m + \hat{I}_m(k) + W_m(k)$$

So estimate $u_m$ by $$\hat{u}_m(k) = \text{sgn}\{Y_m - \hat{I}_m(k)\}$$

With a short code (256 chips) on the uplink from mobile user to base station, parallel interference cancellation (PIC) can be done at the symbol level and becomes computationally simpler than regenerating the interference and subtracting at the chip level. The crosscorrelations are computed between all the symbols in the 256-chip window. Because the signals arrive asynchronously the window must be extended by one or two symbols on each side to include any symbols which partially enter the window. The base station first uses the conventional rake receiver to demodulate all the users in the cell. For each symbol in the window one row of the crosscorrelation matrix is used to cancel the interference. As before, preferred embodiment correlating processor of FIG. 1 is used to compute the cross correlations. The crosscorrelation values are multiplied by the initial data estimates for the interfering signals and subtracted from the desired symbol. This completes one stage of PIC. Additional stages are accomplished by starting with the original rake output for the desired symbol and subtracting the interference calculated by multiplying the row of the crosscorrelation matrix by the improved estimates of the interfering symbols.

Since the periodicity in the short code is 256 chips, a window of 256 chips can be selected arbitrarily. In WCDMA the length of each symbol will be 4, 8, 16, 32, 64, 128, or 256 chips. Within the window the desired symbols can be chosen to be any symbols that start within the window. Then by breaking the frame into 256 chip windows PIC can be performed on all the symbols. A crosscorrelation matrix can be formed which includes the correlations of any of the desired symbols with any other symbols that overlap them. The matrix does not have to be square because it can include overlapping symbols that are not desired symbols. The crosscorrelation between the $i_1$ symbol of finger $k_1$ of user $m_1$ and the $i_2$ symbol of finger $k_2$ of user $m_2$ can be calculated as $$R_{(i_1, m_1, k_1), (i_2, m_2, k_2)} = \int c_{i_1, m_1}(t - \tau_{i_1, m_1, k_1}) c^*_{i_2, m_2}(t - \tau_{i_2, m_2, k_2})$$

The term $c_{i,m}$ is the chip sequence for the $i^{th}$ symbol of user m, the term $\tau_{i,m,k}$ is the time delay of the $i^{th}$ symbol of finger k of user m, and (.)* denotes the complex conjugation operation (e.g., QPSK). Again, the preferred embodiment CCP of FIG. 1 is used to perform these code cross-correlation computations along with signal correlations.

The advantage of using short codes on the uplink is that the crosscorrelation matrix does not change from one 256-chip window to the adjacent window, and the matrix does not have to be updated until the relative path delays of a user change. The diagonal terms in the matrix R corresponding to the same symbol, finger, and path ($i_1=i_2$, $m_1=m_2$, and $k_1=k_2$ in the equation) can be set to 0 since the interference cancellation should not cancel out the desired signal. Let the vector of matched filter outputs be denoted Y (0), where the index 0 identifies the $0^{th}$ iteration. The parallel interference cancellation iteration is then $$Y(j+1)=Y(0)-R\hat{A}(j)\hat{u}(j)$$

where $\hat{A}(j)$ is the vector of channel estimates for all the paths and users in the $j^{th}$ iteration of the interference canceller and $\hat{u}(j)$ is the vector of estimates of the data symbols. More explicitly, this matrix equation is:

$$\begin{bmatrix} Y_1(j+1) \\ Y_2(j+1) \\ Y_3(j+1) \\ \vdots \\ Y_k(j+1) \end{bmatrix} = \begin{bmatrix} Y_1(0) \\ Y_2(0) \\ Y_3(0) \\ \vdots \\ Y_k(0) \end{bmatrix} - \begin{bmatrix} R_{1,1} & R_{1,2} & R_{1,3} & \cdots & R_{1,k} \\ R_{2,1} & R_{2,2} & R_{2,3} & \cdots & R_{2,k} \\ R_{3,1} & R_{3,2} & R_{3,3} & \cdots & R_{3,k} \\ \vdots & \vdots & \vdots & \ddots & \vdots \\ R_{k,1} & R_{k,2} & R_{k,3} & \cdots & R_{k,k} \end{bmatrix} \begin{bmatrix} \hat{A}_1(j)\hat{u}_1(j) \\ \hat{A}_2(j)\hat{u}_2(j) \\ \hat{A}_3(j)\hat{u}_3(j) \\ \vdots \\ \hat{A}_k(j)\hat{u}_k(j) \end{bmatrix}$$

After each iteration of the interference canceller, the terms for each of the paths of a user for one symbol are combined (usually using a maximal ratio combiner, MRC), and a decision on the symbol is made to find the data estimate. Of course, the data on any pilot symbols is already known, and the data for any symbols belonging to previous windows is assumed to have been already accurately estimated.

3. Alternative Preferred Embodiments

The interference cancellation preferred embodiments could be varied by using other cancellation methods while retaining the use of the multiplexing correlating coprocessor.

Moreover, the preferred embodiment may be applied with a long code, that is a code whose periodicity is much longer than the symbol period.

4. Modifications

The preferred embodiments can be modified in various ways while retaining the features of a code correlating processor which provides both correlation for symbol estimation and cross-correlations for interference estimation with a latched code.

For example, the adder trees could be combined with the accumulator, the code correlating processor could be a coprocessor in a multiprocessor platform which includes a DSP plus a RISC processor, and so forth.

What is claimed is:

1. A processor, comprising:
(a) a code generator;
(b) a multiplexer with inputs coupled to an input source and to said code generator and output coupled to an input of a multiplier;
(c) a latch coupled between said code generator and an input of said multiplier, whereby a first code generated by said code generator is held in said latch and used or modified and used to successively correlate with data in said source or with codes generated in said code generator.

2. The processor of claim 1, further comprising:
(a) an adder tree coupled to an output of said multiplier;
(b) an accumulator coupled to an output of said adder tree; and
(c) a memory coupled to said accumulator.

3. A method of detection, comprising:
(a) providing N data chips where N is the length of a plurality of codes;
(b) provide N chips of a code of said plurality;
(c) combine said N chips from step (b) with a second code;
(d) multiply the result of step (c) by said N data chips from step (a) and accumulate;
(e) provide N chips of a code of said plurality;
(f) multiply the result of step (e) by said N chips from step (b) and accumulate;
(g) repeat steps (e) and (f);
(h) repeat steps (b) through (g); and
(i) repeat steps (a) through (h).

4. A receiver, comprising:
(a) a sampler which samples at a rate exceeding a chip rate of a received spread spectrum signal;
(b) an input buffer coupled to said sampler;
(c) a code correlating processor coupled to said input buffer, said processor including a code generator, a vector multiplier, adder trees, and an accumulator whereby correlations of a vector of samples in said buffer and a code are computed;
(d) a latch coupled to said code generator; and
(e) a multiplexer coupled to said code generator and to said input buffer, whereby correlations of first and second codes are computed.

* * * * *